US006839209B2

(12) United States Patent
Shea et al.

(10) Patent No.: US 6,839,209 B2
(45) Date of Patent: Jan. 4, 2005

(54) SHORTING SWITCH AND SYSTEM TO ELIMINATE ARCING FAULTS IN POWER DISTRIBUTION EQUIPMENT

(75) Inventors: John J. Shea, Pittsburgh, PA (US); Yun-Ko N. Chien, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 223 days.

(21) Appl. No.: 10/172,238

(22) Filed: Jun. 14, 2002

(65) Prior Publication Data

US 2003/0231443 A1 Dec. 18, 2003

(51) Int. Cl.7 .................................................. H02H 3/00
(52) U.S. Cl. .............................................. 361/42; 361/2
(58) Field of Search ................................ 361/2, 10, 14, 361/42, 43, 44, 45, 46, 47, 48, 49, 50, 115

(56) References Cited

U.S. PATENT DOCUMENTS 3,771,089 A * 11/1973 Link .......................... 337/277
4,562,323 A * 12/1985 Belbel et al. ............... 218/117
4,677,266 A * 6/1987 Belbel et al. ............... 218/117
5,510,946 A 4/1996 Franklin
5,597,991 A * 1/1997 Chen et al. .............. 200/50.02
5,903,427 A 5/1999 Roby
5,933,308 A 8/1999 Garzon
5,940,547 A 8/1999 Schumacher et al.
6,084,756 A * 7/2000 Doring et al. ................ 361/45
6,140,715 A 10/2000 Bernhoff et al.
6,141,192 A 10/2000 Garzon
6,229,680 B1 5/2001 Shea
6,239,514 B1 5/2001 Isberg et al.
6,414,256 B1 * 7/2002 Chen et al. .................... 218/89
6,424,632 B1 * 7/2002 Poret et al. .............. 370/395.3
6,518,865 B1 * 2/2003 Al-Hosini et al. .......... 335/147
6,605,918 B2 * 8/2003 Mayhew et al. ............ 318/727

OTHER PUBLICATIONS

Klockner–Moeller Ltd., "ARCON, Arc Fault Detection and Quenching System", 6 pgs.
UTU, "UTU Arc Protection Systems—a possibility to be protected", 4 pgs., Ulvila, Finland.
Garzon, R., "Arc Terminator An Alternative to Arc–Proofing", pp. 1–5, Square "D" Company, Smyrna, TN.
Square D Schneider Electric, "Arc–Terminator—Medium voltage arc–detection and arc–termination device", Power 2000, 9 pgs.
ABB Power Distribution, "ArcEliminator Rapid Elimination of Internal Arcing", 4 pgs., Arboga, Sweden.
Siemens, "Pressure Switch System 8AX10 For Medium Voltage Switchgear", 1 pg.
Berger, F. et al., "KurzschlieBer mit Gasgeneratorantrieb fur Storlichtbogenschutz", 4 pgs., Mar. 1999, Federal Republic of Germany.
RISI, "EBW Cable Cutter", 1 pg., San Ramon, CA.
RISI, "Technical Discussion on Explosives", 13 pgs.

* cited by examiner

*Primary Examiner*—Brian Sircus
*Assistant Examiner*—Danny Nguyen
(74) *Attorney, Agent, or Firm*—Martin J. Moran

(57) ABSTRACT

A shorting switch eliminates arcing faults in power distribution equipment. The shorting switch includes an insulating tubular housing; a first contact; a second contact; and an insulator between the first and second contacts in the insulating housing. The insulator prevents electrical connection of the first and second contacts. First and second terminals are respectively electrically connected to the first and second contacts. A wave spring mechanism moves the first and second contacts toward closure. A slug and an activated charge mechanism drive the insulator from between the first and second contacts, in order to electrically connect the first and second contacts.

20 Claims, 6 Drawing Sheets

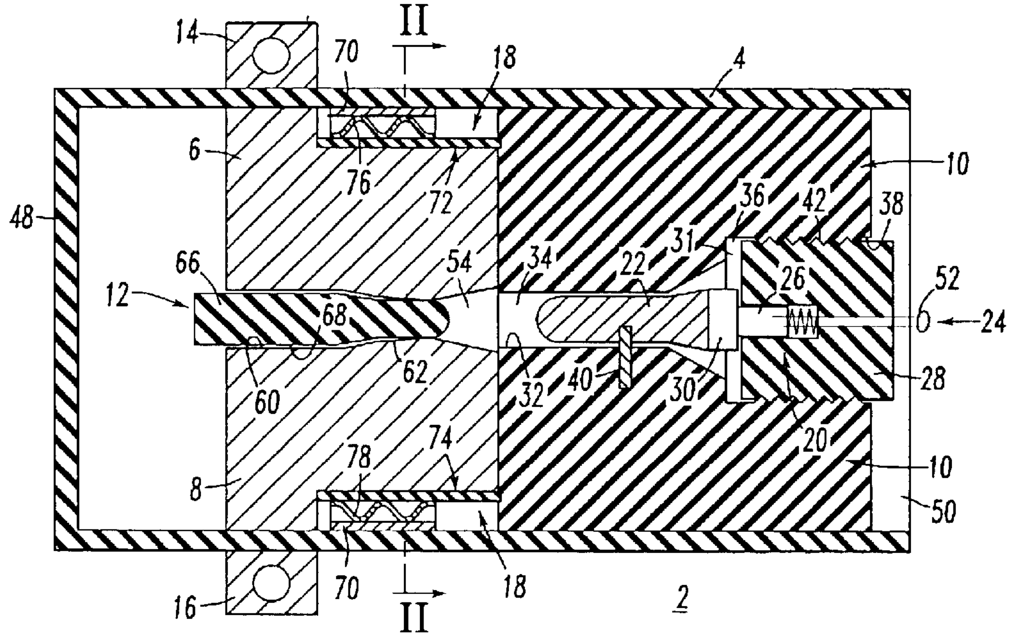
FIG. 1
FIG. 2
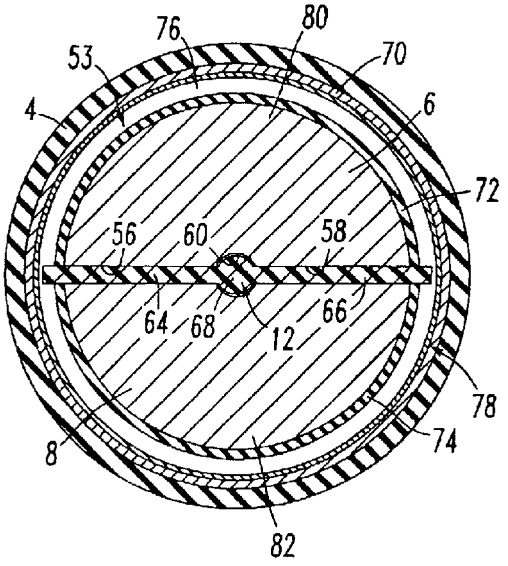

FIG. 6
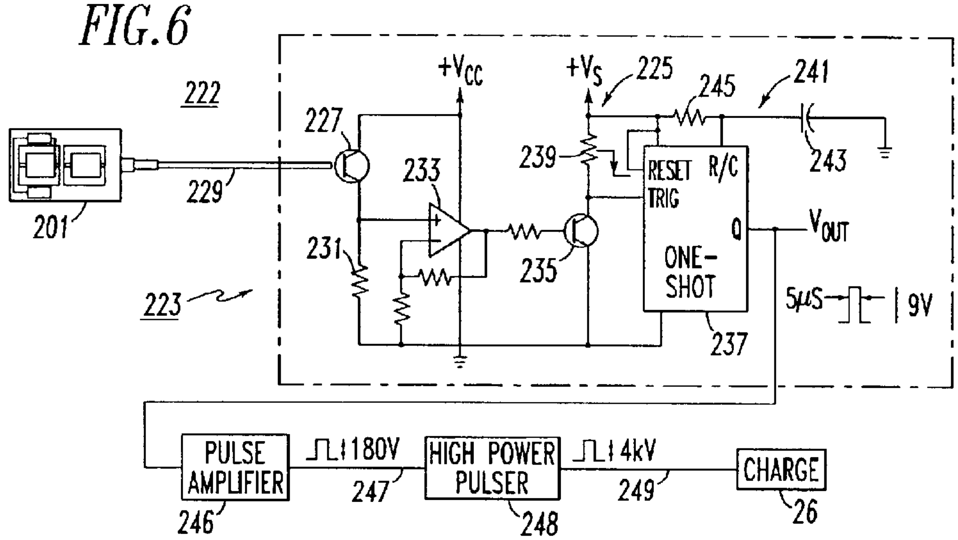
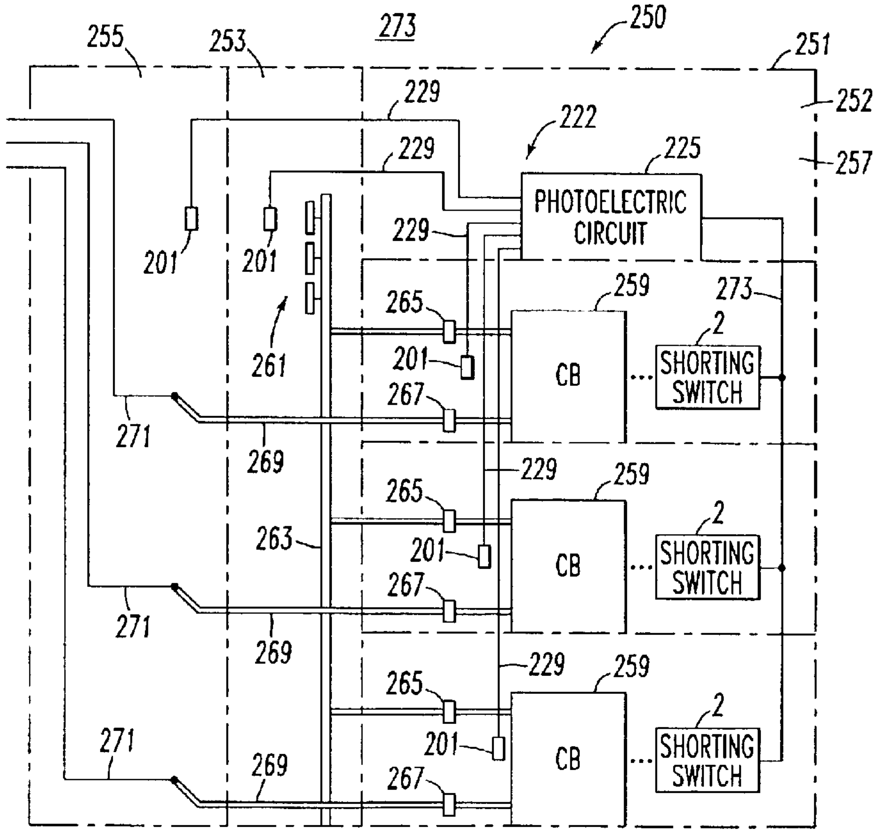
FIG. 7

SHORTING SWITCH AND SYSTEM TO ELIMINATE ARCING FAULTS IN POWER DISTRIBUTION EQUIPMENT

CROSS-REFERENCE TO RELATED APPLICATIONS

This application is related to commonly assigned, concurrently filed:

U.S. Pat. No. 6,724,604 issued Apr. 20, 2004, entitled "Shorting Switch And System To Bliminate Arcing Faults In Power Distribution Equipment";

U.S. Pat. No. 6,675,150 issued Dec. 20, 2003, entitled "Shorting Switch And System To Eliminate Arcing Faults In Power Distribution Equipment";

U.S. Pat. No. 6,33,009 issued Oct. 14, 2003 entitled "Shorting Switch And System To Eliminate Arcing Faults In Low Voltage Power Distribution Equipment";

U.S. patent application Ser. No. 10/172,622, filed Jun. 14, 2002, entitled "Bullet Assembly For A Vacuum Arc Interrupter";

U.S. patent application Ser. No. 10/172,080, filed Jun. 14, 2002, entitled "Vacuum Arc Interrupter Having A Tapered Conducting Bullet Assembly";

U.S. patent application Ser. No. 10/172,209, filed Jun. 14, 2002, entitled "Vacuum Arc Interrupter Actuated By A Gas Generated Driving Force";

U.S. patent application Ser. No. 10/172,628, filed Jun. 14, 2002, entitled "Blade Tip For Puncturing Cupro-Nickel Seal Cup"; and U.S. patent application Ser. No. 10/172,281, filed Jun. 14, 2002, entitled "Vacuum Arc Eliminator Having A Bullet Assembly Actuated By A Gas Generating Device".

BACKGROUND OF THE INVENTION

1. Field of the Invention

The invention is directed to shorting switches and, in particular, to shorting switches for eliminating arcing faults in power distribution equipment. The invention is also directed to shorting systems for eliminating arcing faults in power distribution equipment.

2. Background Information

There is the potential for an arcing fault to occur across the power bus of a motor control center (MCC), another low voltage (LV) enclosure (e.g., an LV circuit breaker panel) and other industrial enclosures containing LV power distribution components. This is especially true when maintenance is performed on or about live power circuits. Frequently, a worker inadvertently shorts out the power bus, thereby creating an arcing fault inside the enclosure. The resulting arc blast creates an extreme hazard and could cause injury or even death. This problem is exacerbated by the fact that the enclosure doors are typically open for maintenance.

It is known to employ a high-speed shorting switch, placed between the power bus and ground, or from phase-to-phase, in order to limit or prevent equipment damage and personnel injury due to arc blasts. Such switches, which are large and costly, are located on the main power bus to shut down the entire power bus system when a fault occurs even if the fault is only on the load side of a branch circuit.

It is also known to employ various types of crowbar switches for this purpose. The switches short the line voltage on the power bus, eliminating the arc and preventing damage. The resulting short on the power bus causes an upstream circuit breaker to clear the fault.

Examples of medium voltage devices include a stored energy mechanism with vacuum interrupter contacts, and a mechanism to crush a conductor magnetically.

An example of a low voltage device is a stored energy air bag actuator, which drives a conductive member having a pin and a flange, in order to short two contacts. The first contact is in the form of a receptor for capturing the pin of the driven conductive member. The second contact has an opening, which allows the pin to pass therethrough, but which captures the flange of the driven member.

There is room for improvement in shorting switches and systems that respond to arcing faults and switch fast enough in order to protect workers and equipment from arc blasts associated with low voltage power distribution equipment.

SUMMARY OF THE INVENTION

These needs and others are met by the present invention, which provides a high-speed shorting switch that can extinguish an arcing fault in switchgear. This switch is a low cost, one-shot, replaceable module that can be installed, for example, on the load side of a circuit breaker to allow selective tripping.

As one aspect of the invention, a shorting switch for eliminating arcing faults in power distribution equipment comprises: an insulating housing; a first contact; a second contact; an insulator between the first and second contacts in the insulating housing, the insulator preventing electrical connection of the first and second contacts; first and second terminals respectively electrically connected to the first and second contacts; means for moving the first and second contacts toward closure; and means for driving the insulator from between the first and second contacts, in order to electrically connect the first and second contacts.

The means for driving the insulator may comprise a slug, and means for driving the slug between the first and second contacts, in order to drive the insulator from between the first and second contacts. The slug may be a bullet. The bullet may be made of copper, which electrically connects the first and second contacts after the insulator is driven from between the first and second contacts.

The means for driving the slug may include a charge, means for holding the charge, and a buffer disposed between the charge and the slug. The charge may be an electrically activated, chemical charge. The charge may be activated to provide a shock wave to drive the slug between the first and second contacts, thereby driving the insulator from between the contacts and shorting the contacts.

The switch may employ two spring-loaded contacts held apart by the insulator. The charge, such as a high-pressure generator, may drive the slug between the contacts, driving out the insulator, and shorting out the contacts. The contact geometry and relatively high spring force may keep the slug in good electrical contact with the contacts during the relatively high arcing fault current flow.

As another aspect of the invention, a shorting system for eliminating an arcing fault in power distribution equipment comprises: an insulating housing; a first contact; a second contact; an insulator between the first and second contacts in the insulating housing, the insulator preventing electrical connection of the first and second contacts; first and second terminals respectively electrically connected to the first and second contacts; means for moving the first and second contacts toward closure; means for driving the insulator from between the first and second contacts responsive to an activation signal, in order to electrically connect the first and second contacts; and means for detecting an arcing fault and responsively providing the activation signal to the means for driving the insulator.

As another aspect of the invention, a shorting switch for eliminating arcing faults in power distribution equipment comprises: an insulating housing; a fixed contact; a slug; a first terminal electrically connected to the fixed contact; a second terminal; a flexible conductor electrically connecting the slug to the second terminal; and means for driving the slug into electrical connection with the first contact.

The first contact may have a wall facing the slug and a cavity behind the wall. The means for driving the slug may drive the slug through the wall and at least partially within the cavity, in order to electrically connect the slug with the first contact. The first contact may further have an insulator disposed on the wall facing the slug. The means for driving the slug may include a charge. The insulating housing may include an opening holding the charge.

As another aspect of the invention, a shorting switch for eliminating arcing faults in power distribution equipment comprises: a knife switch comprising: a pivot point, a knife member having a first end electrically engaging and pivoting about the pivot point and a second end, and a receptacle adapted to electrically engage the second end of the knife member; a first terminal electrically connected to the pivot point of the knife switch; a second terminal electrically connected to the receptacle of the knife switch; and means for driving the second end of the knife member of the knife switch into electrical connection with the receptacle of the knife switch.

BRIEF DESCRIPTION OF THE DRAWINGS

A full understanding of the invention can be gained from the following description of the preferred embodiments when read in conjunction with the accompanying drawings in which:

FIG. 1 is a cross-sectional view of a shorting switch in accordance with the present invention.

FIG. 2 is a cross-sectional view along lines II—II of FIG. 1.

FIG. 6 is a schematic diagram of sensor electronics suitable for use with the shorting switch of FIG. 1.

FIG. 7 is a diagram illustrating application of the invention to arc protection in switchgear.

DESCRIPTION OF THE PREFERRED EMBODIMENTS

Figure 3:
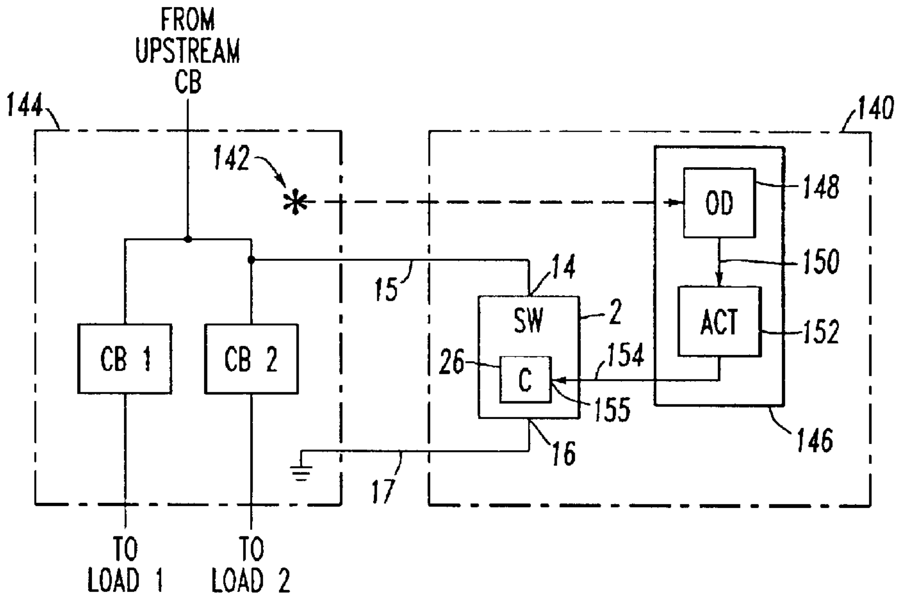
FIG. 3 is a block diagram of a shorting system including the shorting switch of FIG. 1.

FIG. 1 shows a high-speed low voltage shorting switch 2 employing a combination of solid and gas (e.g., air) insulation. The exemplary shorting switch 2 is a relatively low cost, one-shot, crowbar switch, which advantageously eliminates arcing faults in low voltage power distribution equipment (not shown). The shorting switch 2 is activated (as discussed below in connection with FIG. 3) when an arcing fault is detected.

The shorting switch 2 includes an insulating housing, such as insulating tube 4, a first contact 6, a second contact 8, a first insulator 10, and a second insulator 12. Any suitable solid insulator (e.g., thermal set polyester; a thermal plastic, such as Delrin or Nylon) may be employed in the exemplary insulating tube 4 and/or insulators 10,12. Any suitable conductor (e.g., copper) may be employed for the contacts 6,8. The second insulator 12 is between the first and second contacts 6,8 in the insulating tube 4, in order to normally prevent electrical connection of such contacts 6,8.

Figure 10:
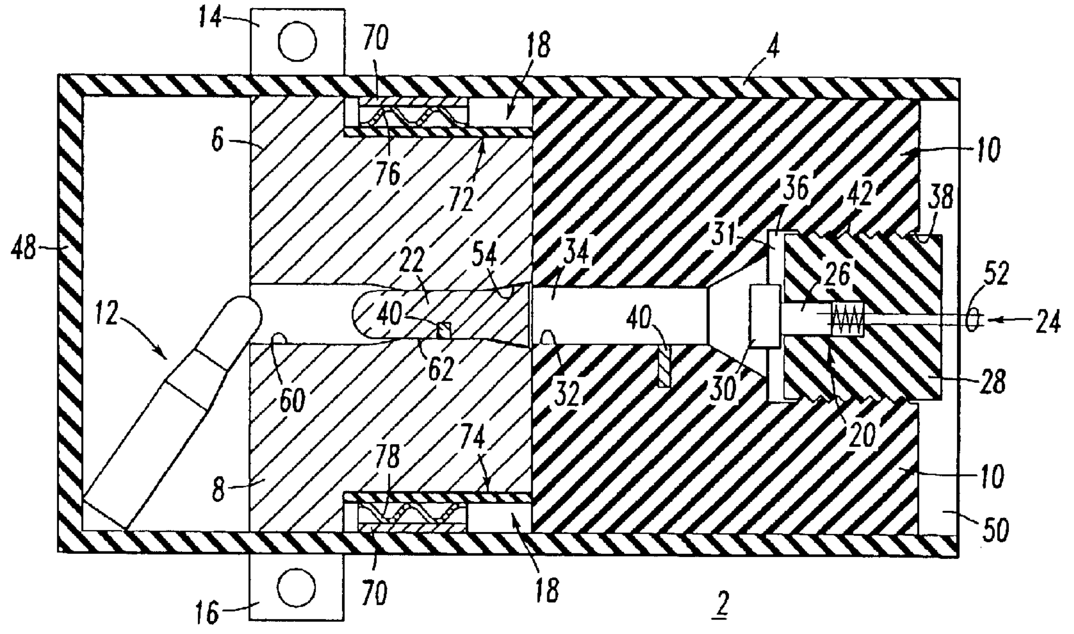
FIG. 10 is a cross-sectional view of the shorting switch of FIG. 1 in which the slug electrically connects the first and second contacts after an arcing fault is detected.

First and second terminals 14,16 are respectively electrically connected to the first and second contacts 6,8. A spring mechanism 18 moves the first and second contacts 6,8 toward closure. A charge mechanism 20 drives the second insulator 12 from between the first and second contacts 6,8, in order to electrically connect such contacts. The charge mechanism 20 includes a slug 22 and a suitable high-pressure generator 24 for driving the slug 22 between the first and second contacts 6,8, in order to drive the second insulator 12 from between such contacts. Preferably, the slug 22 is a bullet made of copper, which bullet drives the second insulator 12 from between the first and second contacts 6,8. As shown in FIG. 10, the slug 22 preferably is captured by and, thus, electrically connects the first and second contacts 6,8 after the second insulator 12 is driven from between such contacts.

The high-pressure generator 24 includes a charge, such as a relatively small, electrically activated, chemical charge 26, which is activated to provide a shock wave to drive the slug 22 between the first and second contacts 6,8, thereby driving the second insulator 12 from between such contacts and shorting such contacts. The exemplary charge 26 is a model number RP-501 charge made by Reynolds Industries Systems, Inc. (RISI). The RP-501 is a standard, end lighting, exploding bridge wire (EBW) detonator for use in general purpose applications (e.g., it is capable of detonating compressed TNT and COMP C-4). Although an exemplary detonator charge is employed, any suitable charge (e.g., an accelerator) may be employed to drive a slug and/or to close separable contacts. A suitable (e.g., metal or plastic) charge holder 28 holds the charge 26, and a suitable buffer, such as an aluminum disk 30, is disposed between the charge 26 and the slug 22.

The first insulator 10 is disposed in the insulating tube 4 and has a conduit 31 passing therethrough. The conduit 31 has a first opening 32, a first passageway 34, a second passageway 36, and a second opening 38. The slug 22 rests in the first passageway 34, and the charge holder 28 is held in the second passageway 36. Preferably, a shear pin 40 engages the slug 22 and the first insulator 10 within the first passageway 34, in order to hold such slug therein prior to activation of the charge 26. Preferably, the second passageway 36 is a threaded passageway, and the charge holder 28 has a plurality of threads 42, which threadably engage the threaded passageway 36.

Figure 11:
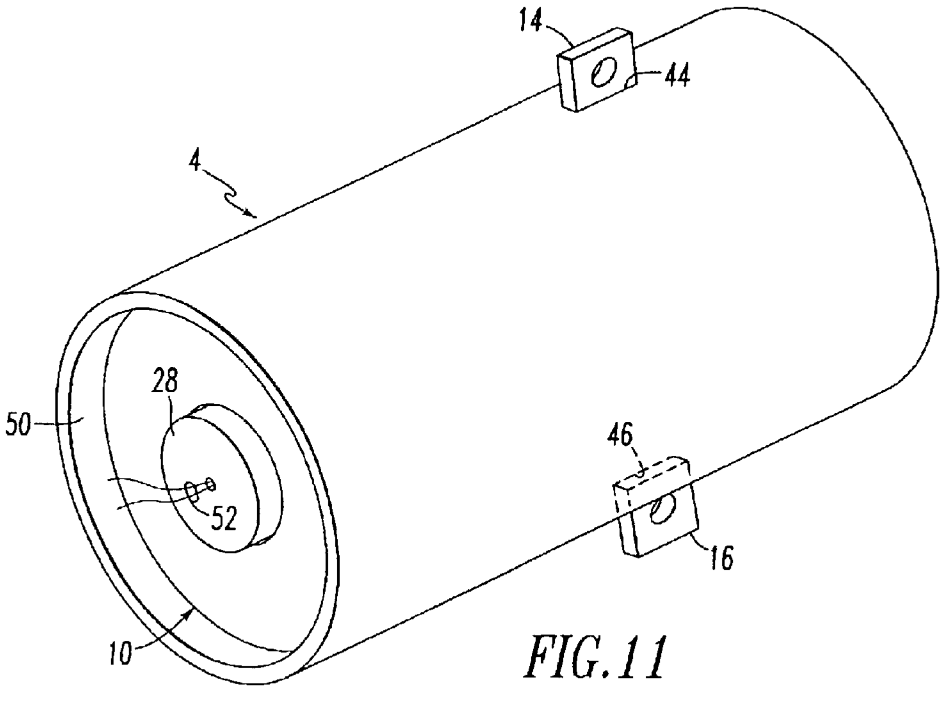
FIG. 11 is an isometric view of the shorting switch of FIG. 1.

As shown in FIGS. 1 and 11, the first and second terminals 14,16 extend from the first and second contacts 6,8 of FIG. 1 and pass through openings 44,46, respectively, of the insulating tube 4. In the exemplary embodiment, the insulating tube 4 is cylindrical and has at least one closed end 48.

The other end 50 of the tube 4 is open, although a closed end with a sealed opening (not shown) for the conductors 52 of the charge 26 may be employed. Preferably, as best shown in FIG. 2, the first and second contacts 6,8 are first and second half cylinders, respectively, disposed within the cylindrical insulating tube 4, although a wide range of contact structures may be employed. The exemplary contacts 6,8 form a generally cylindrical structure 53 within the cylindrical insulating tube 4. That generally cylindrical structure has an opening 54 passing therethrough, which opening 54 normally receives the second insulator 12 or, else, the slug 22 (FIG. 10) after an arcing fault.

Continuing to refer to FIG. 2, the opening 54 of the generally cylindrical structure 53 includes a generally planar portion, as shown at 56,58, and a generally cylindrical passageway 60. The generally planar portion, as shown at 56,58, and the generally cylindrical passageway 60 normally receive the second insulator 12. As shown in FIG. 1, the generally cylindrical passageway 60 of the opening 54 has a tapered portion 62, which receives and captures the slug 22 (as shown in FIG. 10). The second insulator 12 includes a generally planar portion 64,66 corresponding to the generally planar portion 56,58 of the opening 54 and a generally cylindrical portion 68 corresponding to the generally cylindrical passageway 60 of the opening 54. Preferably, as best shown in FIG. 1, the terminals 14,16 are normal to the generally planar portion 66 (and 68) of the second insulator 12.

Referring again to FIGS. 1 and 2, the spring mechanism 18, which moves the first and second movable contacts 6,8 toward closure includes a cylindrical steel hose clamp 70 disposed within the cylindrical insulating tube 4 and first and second insulating half shells 72,74. A first wave spring 76 is disposed between the clamp 70 and the first insulating half shell 72. A second wave spring 78 is disposed between the clamp 70 and the second insulating half shell 74. The first and second insulating half shells 72,74 engage first and second half cylinder portions 80,82 of the contacts 6,8, respectively, to prevent the first and second copper contacts 6,8 from separating and arcing during operation in the shorting position of FIG. 10.

As shown in FIG. 10, the tapered portion 62 of the opening 54 and the first and second wave springs 76,78 cooperate to keep the slug 22 and the first and second half cylinder portions 80,82 of the respective contacts 6,8 electrically connected during an arcing fault. Although FIG. 10 shows the slug 22 electrically engaging the first and second half cylinder portions 80,82, the invention is applicable to a shorting switch in which a slug, such as 22, passes completely through an opening, such as 54, such that contacts, such as 6,8, are directed electrically connected during an arcing fault. Although both of the exemplary contacts 6,8 are movable, the invention is applicable to shorting switches having a fixed contact and a movable contact.

FIG. 3 shows a shorting system 140 including one or more shorting switches 2 (only one switch (SW) 2 is shown in FIG. 3) of FIG. 1. The shorting system 140 eliminates an arcing fault 142 in low voltage power distribution equipment 144. The shorting system 140 also includes a detection and activation circuit 146 for detecting the arcing fault 142 and responsively activating the shorting switch charge (C) 26, in order that the activated charge 26 results in the elimination of the arcing fault as discussed above in connection with FIGS. 1 and 2. The circuit 146 includes a detection (OD) circuit 148 for detecting the arcing fault 142 and responsively outputting one or more trigger signals 150, and an activation circuit (ACT) 152 for detecting the one or more trigger signals 150 and responsively outputting the activation signal 154 to the electrical inputs 155 of the charges 26.

The activation signal 154 is communicated to the conductors 52 of the charge 26. The charge 26 responds to the activation signal 154 to drive the slug 22, which, in turn, drives the second insulator 12 from between the first and second contacts 6,8, as discussed in connection with FIGS. 1, 2, 10 and 11, in order to electrically connect such contacts.

The terminals 14,16 are adapted for electrical connection to the low voltage power system 144 (e.g., without limitation, a 690 VAC power system; a 690 VAC circuit breaker) by suitable electrical conductors 15,17, respectively, of FIG. 3. For example, such electrical conductors may be electrically connected to two power lines (e.g., without limitation, a power line and a ground, a power line and a neutral, a load terminal of a circuit breaker and a corresponding ground or neutral).

Although a single-pole shorting switch 2 is disclosed in FIGS. 1, 2, 10 and 11, a three-pole embodiment of the switch (not shown) shorts all three phases (e.g., phases A, B and C) to ground, thereby rapidly extinguishing an arc before its first current peak. Other than the slug 22, which engages the tapered portion 62 of the opening 54, there are essentially no moving parts in the shorting switch 2. During operation, there is a very slight movement of the contacts 6,8 and terminals 14,16. Hence, suitably flexible external wiring is preferably employed at the terminals 14,16.

Although the exemplary shorting switch 2 does not employ a vacuum within the tube 4, vacuum insulation (not shown) therein improves operating and Basic Impulse Level (BIL) voltage isolation requirements for medium voltage power systems.

Figure 4:
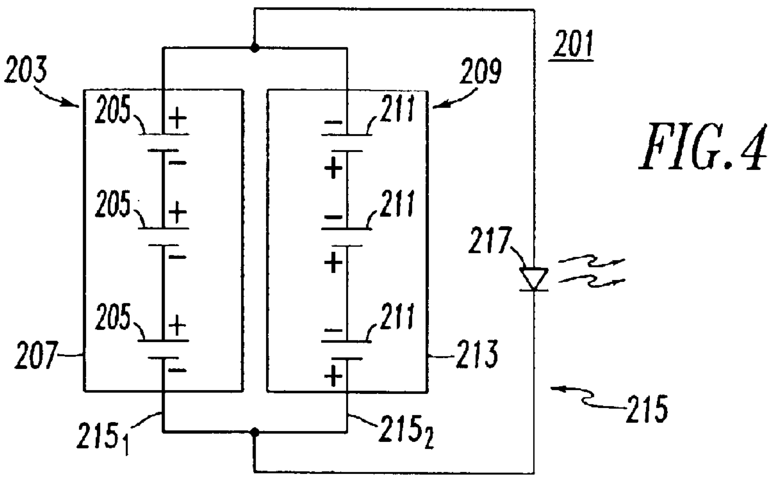
FIG. 4 is a schematic diagram of a sensor suitable for use with the shorting switch of FIG. 1.

The detection circuit 148 utilizes photovoltaic cells in a sensor unit. One form of the sensor unit 201 is illustrated in FIG. 4. The sensor unit 201 includes the first photovoltaic device 203 including at least one, or a plurality of series connected photovoltaic cells 205, and a first filter 207 which filters light incident upon the photovoltaic cells 205. This first filter 207 has a passband centered on the characteristic wavelength, e.g., 521.820 nm, of the arcing material.

The sensor 201 includes a second photovoltaic device 209, which also includes one or more series connected photovoltaic cells 211, and a second filter 213 which filters light incident upon the photovoltaic cells 211 and has a passband that does not include the characteristic wavelength of the arcing material, e.g., centered on about 600 nm in the exemplary system.

The first photovoltaic device 203 generates a sensed light electrical signal in response to the filtered incident light, and similarly, the second photovoltaic device 209 generates a background light electrical signal with an amplitude dependent upon the irradiance of light in the passband of the second filter 213. An electric circuit 215, having a first branch $215_1$ connecting the first photovoltaic cells 203 in series and a second branch $215_2$ similarly connecting the second photovoltaic cells 211 in series, connects these two electrical signals in opposition to a light-emitting device such as a light-emitting diode (LED) 217. When arcing is present, the sensed light electrical signal generated by the first photovoltaic device 203 exceeds the background light electrical signal generated by the second photovoltaic device 209 by a threshold amount sufficient to turn on the LED 217. While in the absence of arcing, the first photovoltaic device 203 will generate a sensed light electrical signal due to some irradiance in the passband of the first filter 207, it will be insufficient to overcome the reverse bias effect of the background light signal generated by the second photovoltaic device 209 on the LED 217. In fact, where the background light is fluorescent, from an incandescent bulb or a flashlight all of which have very low irradiance in the passband of the first filter 207, but significant irradiance in the passband of the second filter 213, the background light electrical signal will significantly exceed the sensed light electrical signal and strongly reverse bias the LED 217. The filters 207 and 213 can be interference filters, although lower cost bandpass filters could also be utilized.

Figure 5A:
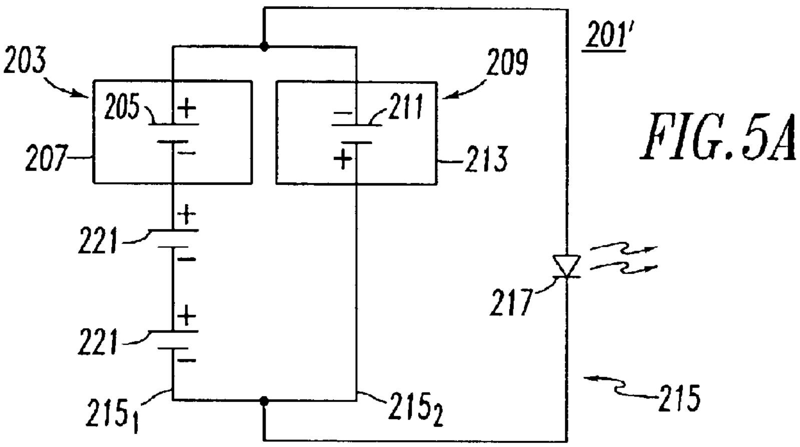
FIG. 5A is a schematic diagram of another sensor suitable for use with the shorting switch of FIG. 1.

An alternate embodiment of the sensor unit 201' shown in FIG. 5A adds a bias generator 219 in the form of one or more additional photovoltaic cells 221 connected in series with the first photovoltaic device 203 in the first branch $215_1$ of the electrical circuit 215. This puts a forward bias on the LED 217 so that fewer or smaller filtered photovoltaic cells 205 and 211 can be used. This also reduces the size and therefore the cost of the filters 207 and 213. As the additional photovoltaic cells 221 are not provided with filters, the total cost of the sensor is reduced. The embodiment of FIG. 5A can be modified as shown in FIG. 5B to place the bias generating cells 221 of the sensor 201" in series with both filtered photovoltaic cells 205 and 211, but still provide the same effect of forward biasing the LED 217.

Figure 5B:
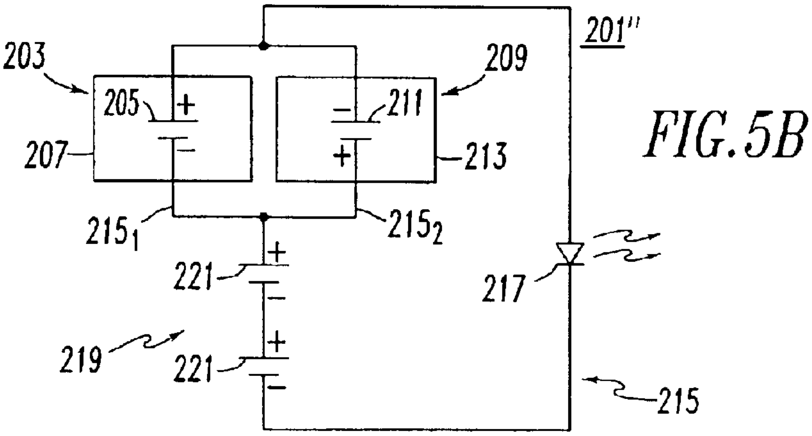
FIG. 5B is a schematic diagram of a modified form of the sensor of FIG. 5A.

Through their utilization of photovoltaic cells 205, 211 and 221, the sensors 201 and 201' of FIGS. 4 and 5A–B are self-energized.

FIG. 6 illustrates an example of an arcing fault detector 222. The sensor unit 201 (or 201') is connected to a response device 223, which includes a photoelectric circuit 225. This photoelectric circuit includes a photo diode 227, which is activated by the light signal generated by the sensor 201. The light signal is transmitted from the sensor 201 to the photo detector 227 by an optic fiber 229. This permits the photoelectric circuit 225 to be remotely located from the component being monitored where the arcing fault detector is used, for instance, in switchgear. This removes the photoelectric circuit 225 from the vicinity of voltages that could otherwise produce electromagnetic interference in the electronics. Thus, the optic fiber 229 provides electrical isolation for the photoelectric circuit 225. As the light signal generated by the sensor 201 is essentially a digital signal, that is it is on when an arcing fault is detected and off in the absence of arcing, a low-cost optic fiber is suitable for performing the dual functions of transmitting this digital optical signal and providing electrical isolation for the photo-electric circuit 225.

The photodetector 227 is energized by a suitable DC supply voltage such as $+V_{CC}$. The light signal generated by the LED 217 in the presence of arcing turns on the photo detector 227, which causes current to flow through the resistor 231. The voltage across this resistor 231 generated by the current is amplified by the op amp 233 sufficiently to turn on a transistor 235. The transistor 235 provides the trigger signal to a one-shot multi-vibrator 237. Normally, the transistor 235 is off so that a pull-up resistor 239 applies $+V_S$ to the trigger input of the one-shot multi-vibrator 237. When the sensor provides a light signal through the optic fiber 229 to turn on the photodetector 227, the transistor 235 is turned on pulling the trigger input of the one-shot multi-vibrator 237 essentially down to ground. This causes the output Q of the multi-vibrator $V_{out}$ to go high. An RC circuit 241 formed by the capacitor 243 and resistor 245 resets the one-shot multi-vibrator 237 to go low again so that $V_{out}$ is a pulse signal. The arcing fault signal represented by $V_{out}$ can be used to set an alarm, and/or trip a circuit breaker, or otherwise trigger the charge 22 of the shorting switch 2 or initiate a notification action. The time constant of the RC circuit 241 is selected to produce a pulse of sufficient duration to actuate the desired output device.

The output Q of the multi-vibrator 237 provides a trigger pulse $V_{out}$ of suitable amplitude (e.g., about 9 V) and duration (e.g., about 1 to 10 $\mu$s; about 5 $\mu$s) and is electrically connected to a pulse amplifier 246. The output of the pulse amplifier 246, which provides a suitable amplitude (e.g., about 180 V), is electrically connected by a suitable coaxial cable (e.g., RG-58) 247 to a high power pulser 248. The exemplary pulser 248 is a Model 619 made by Cordin Company of Salt Lake City, Utah. The output of the pulser 248, which provides a suitable amplitude (e.g., about 4000 V), is electrically connected by a suitable coaxial cable (e.g., RG-8) 249 to the charge 22 of the shorting switch 2 of FIG. 1.

FIG. 7 illustrates schematically an application of the optical arcing fault detector 222 to distribution systems switchgear. The switchgear 250 includes a metal switchgear cabinet 251. Typically, the cabinet 251 is divided into a forward-compartment 252, a middle compartment 253, and a rear compartment 255. The forward compartment 252 is divided vertically into cells 257 in which are housed electrical switching apparatus such as circuit breakers (CBs) 259. The middle compartment 253 houses rigid buses including a horizontal three-phase bus 261 which is connected to a set of vertical buses (only one visible) 263. The vertical buses are connected to the circuit breakers 259 through upper quick disconnects 265. Lower quick disconnects 267 connect the circuit breakers through runbacks 269 to cables 271 extending from the rear compartment 255.

The optical arcing fault detector 222 can be used to protect the switchgear 250 from arcing faults, which can occur between any of the conductors 261–271 or between such conductors and the metal cabinet 251. Thus, sensors 201 can be inserted into the cells 257, the middle compartment 253 and the rear compartment 255 where they can monitor for arcing faults. Each of the sensors 201 is connected by an optic fiber 229 to the photoelectric circuit 225 that can be contained in the top-most cell 257 of the forward compartment 252 or any other convenient location. Upon detection of an arcing fault, the arc signal generated by the photoelectric circuit 225 can be applied as a trigger signal through a trip lead 273 to each of the high-speed shorting switches 2.

Figure 8:
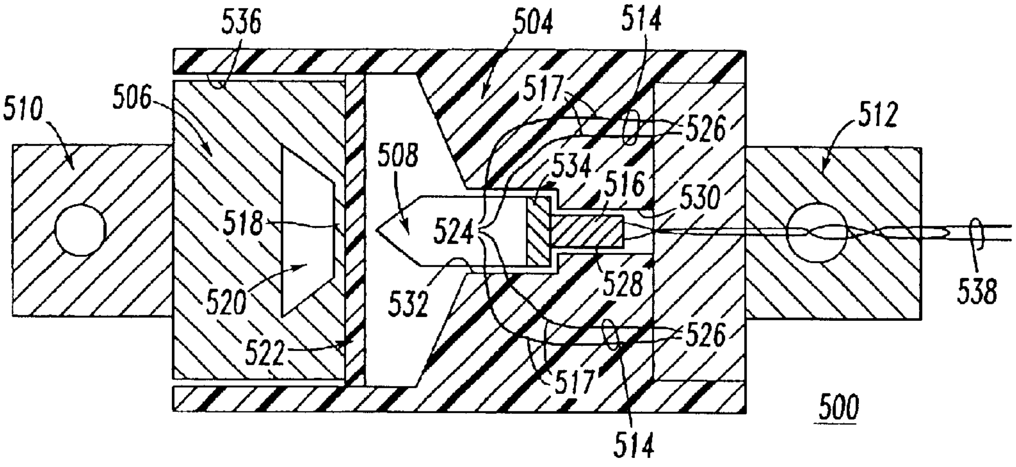
FIG. 8 is a cross-sectional view of a shorting switch in accordance with another embodiment of the invention.

Referring to FIG. 8, a high-speed low voltage shorting switch 500 employs a combination of solid and gas (e.g., air) insulation. The exemplary shorting switch 500, which eliminates arcing faults in low voltage power distribution equipment (not shown), includes an insulating housing 504, a fixed contact 506, a suitable slug 508 (e.g., without limitation, a copper bullet), a first terminal 510 electrically connected to the fixed contact 506, a second terminal 512, a flexible conductor 514 electrically connecting the slug 508 to the second terminal 512, and a relatively high pressure generator 516 for driving the slug 508 into electrical connection with the fixed contact 506. Preferably, the flexible conductor 514 is one or more copper shunts made of laminates of a plurality of relatively thin (e.g., 0.002 inch) solid copper sheets 517 stacked to handle the anticipated fault energy. The fixed contact 506 has a wall 518 facing the slug 508 and a cavity 520 behind the wall 518. Preferably, an insulator 522 is disposed on the wall 518 facing the slug 508. The first end 524 of the flexible conductor 514 is electrically connected (e.g., welded, brazed) to the slug 508 and the second end 526 of the flexible conductor 514 is electrically connected (e.g., welded, brazed) to the second terminal 512.

Preferably, the high pressure generator 516 includes a suitable charge 528 for driving the slug 508. The insulating housing 504 includes a first opening 530 holding the charge 528, a second opening 532 holding a suitable buffer 534 between the charge 528 and the slug 508, and a third opening 536 holding the fixed contact 506 and insulator 522. When the charge 528 is activated by a suitable signal on the conductors 538, the charge 528 drives the slug 508 through the insulator 522 and the wall 518 and at least partially within the cavity 520, in order to electrically connect the slug 508 and the second terminal 512 with the fixed contact 506 and the first terminal 510. Preferably, the contact 506, slug 508, shunts 517 and terminals 510,512 are made of a suitable conductor, such as copper. The conductors 538 are preferably insulated conductors and pass through an opening (not shown) of the insulating housing 504.

Figure 9:
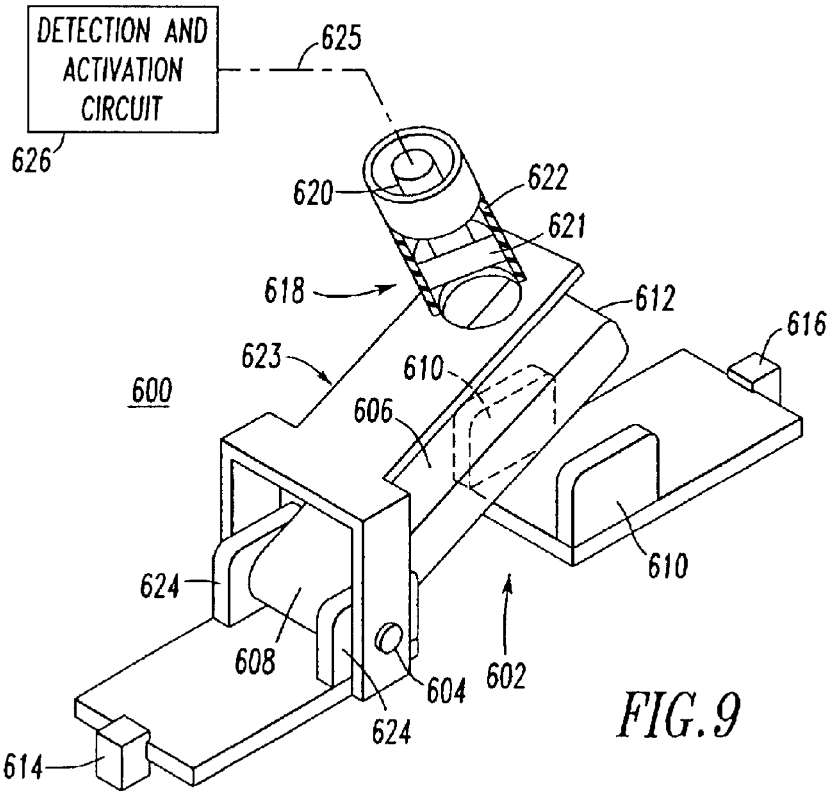
FIG. 9 is an isometric view of a knife blade cantilever shorting switch in accordance with another embodiment of the invention.

Referring to FIG. 9, a high-speed low voltage knife blade cantilever shorting switch 600 employs a combination of solid (e.g., insulator 623) and gas (e.g., air) insulation. The exemplary shorting switch 600, which eliminates arcing faults in low voltage power distribution equipment (not shown), includes a knife switch 602 having a pivot point 604, a knife member 606 with a first end 608 electrically engaging and pivoting about the pivot point 604, and a receptacle 610 for electrically engaging a second end 612 of the knife member 606. A first terminal 614 is electrically connected to the knife switch pivot point 604, and a second terminal 616 is electrically connected to the knife switch receptacle 610. A suitable high pressure mechanism 618 drives the second end 612 of the knife member 606 into electrical connection with the receptacle 610.

The high pressure mechanism 618 includes a suitable charge, such as an electrically activated, chemical charge 620, disposed proximate the second end 612 of the knife member 606 opposite the knife switch receptacle 610. A suitable buffer or flyer 621 is disposed between the charge 620 and the second end 612. A suitable holder 622 holds the charge 620. The holder 622 is supported by an insulating support member (e.g., made of Delrin or glass polyester) 623, which is suitably fixedly mounted with respect to the terminals 614,616 (e.g., at pivot point supports 624). The charge 620 is activated to provide a shock wave to pivot the knife member 606 about the pivot point 604, in order to electrically connect the second end 612 of the knife member 606 with the knife switch receptacle 610. The chemical charge 620 of the high pressure mechanism 618 is responsive to an activation signal 625 from a circuit 626, which is similar to the circuit 146 of FIG. 3, for detecting an arcing fault and responsively providing the activation signal 624.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A shorting switch for eliminating arcing faults in power distribution equipment, said shorting switch comprising:

an insulating housing;

a first contact;

a second contact an insulator between said first and second contacts an said insulating housing, said insulator preventing electrical connection of said first and second contacts;

first and second terminals respectively electrically connected to said first and second contacts;

means for moving said first and second contacts toward closure;

means for driving said insulator from between said first and second contacts, in order to electrically connect said first and second contacts;

wherein said means for driving said insulator comprises a slug, and means for driving said slug between said first and second contacts, in order to drive said insulator from between said first and second contacts; and wherein said means for driving said slug includes a charge; means for holding said charge; and a buffer disposed between said charge and said slug.

2. The shorting switch as recited in claim 1 wherein said charge is an electrically activated, chemical charge.

3. The shorting switch as recited in claim 1 wherein said charge is activated to provide a shock wave to drive said slug between said first and second contacts, thereby driving said insulator from between said contacts and shorting said contacts.

4. The shorting switch as recited in claim 1 wherein said means for holding said charge comprises a charge bolder holding said charge, and an insulator disposed in said insulating housing, said insulator having a conduit passing therethrough, said conduit having a first opening, a first passageway, a second passageway, and a second opening, said slug resting in said first passageway, said charge holder held in said second passageway.

5. The shorting switch as recited claim 4 wherein said second passageway is a threaded passageway; and wherein said charge holder has a plurality of threads, which threadably engage said threaded passageway.

6. The shorting switch as recited in claim 4 wherein said slug includes a shear pin, which engages said insulator and said slug.

7. A shorting switch for eliminating arcing faults in power distribution equipment, said shorting switch comprising:

an insulating housing;

a first contact;

a second contact, an insulator between said first and second contacts in said insulating housing, said insulator preventing electrical connection of said first and second contacts;

first and second terminals respectively electrically connected to said first and second contacts;

means for moving said first and second contacts toward closure;

means for driving said insulator front between said first and second contacts, in order to electrically connect said first and second contacts;

wherein said insulating housing is a cylindrical insulating housing and wherein said first and second contacts form a generally cylindrical structure within said cylindrical insulating housing, said generally cylindrical structure having an opening passing therethrough, said opening receiving said insulator; and wherein said first and second contacts are movable contacts including first and second half cylinders, respectively; and wherein said means for moving said first and second contacts includes a cylindrical clamp disposed within said cylindrical insulating housing, first and second insulating half shells, a first wave spring disposed between said clamp and said first insulating half shell, and a second wave spring disposed between said clamp and said second insulating half shell, said first and second insulating half shells engaging said first and second half cylinders, respectively, to prevent said first and second contacts front separating and arcing durings witching.

8. The shorting switch as recited in claim 7 wherein the opening of said generally cylindrical structure includes a generally planar portion and a generally cylindrical passageway; and wherein said insulator includes a generally planar portion corresponding to the generally planar portion of the opening of said generally cylindrical structure and a generally cylindrical portion corresponding to the generally cylindrical passageway of the opening of said generally cylindrical structure.

9. The shorting switch as recited in claim 8 wherein said means for driving said insulator comprises a slug, and means for driving said slug between said first and second contacts, in order to drive said insulator from between said first and second contacts; wherein maid generally cylindrical passageway has a tapered portion, which engages said slug; and wherein said tapered portion and said first and second wave springs cooperate to keep said slug and said first and second half cylinders electrically connected during an arcing fault.

10. The shorting switch as recited in claim 8 wherein said first and second terminals are normal to the generally planar portion of said insulator.

11. A shorting switch for eliminating arcing faults in power distribution equipment, said shorting switch comprising:

an insulating housing;

a fixed contact;

a slug;

a first terminal electrically connected to said fixed contact;

a second terminal;

a flexible conductor electrically connecting said slug to said second terminal; and means for driving said slug into electrical connection with said fixed contact.

12. The shorting switch as recited in claim 11 wherein said fixed contact has a wail facing said slug and a cavity behind said wall; and wherein said means for driving said slug drives said slug through said wall and at least partially within said cavity, in order to electrically connect said slug with said fixed contact.

13. The shorting switch as recited in claim 12 wherein said fixed contact further has an insulator disposed on said wall facing said slug.

14. The shorting switch as recited in claim 11 wherein said flexible conductor is at least one copper shunt having a first end electrically connected to said slug and a second end electrically connected to said second terminal.

15. The shorting switch as recited in claim 14 wherein said at least one copper shunt is a laminated structure including a plurality of solid stacked copper sheets.

16. The shorting switch as recited in claim 11 wherein said means for driving said slug includes a charge; and wherein said insulating housing includes an opening holding said charge.

17. A shorting system for eliminating arcing faults in power distribution equipment, said shorting system comprising:

a knife switch comprising:

a pivot point, a knife member having a first end electrically engaging and pivoting about said pivot point, said knife member having a second end, a receptacle adapted to electrically engage the second end of said knife member;

a first terminal electrically connected to the pivot point of said knife switch;

a second terminal electrically connected to the receptacle of said knife switch;

means for driving the second end of the knife member of said knife switch into electrical connection with the receptacle of said knife switch, responsive to an activation signal;

means for detecting an arcing fault and responsively providing said activation signal to said means for driving; and wherein said means for driving includes a charge disposed proximate the second end of said knife member opposite the receptacle of said knife switch; and means for fixedly holding said charge proximate the second end of said knife member.

18. The shorting system as recited in claim 17 wherein said charge is an electrically activated, chemical charge.

19. The shorting system as recited in claim 17 wherein said charge is activated to provide a shock wave to pivot the knife member of said knife switch about the pivot point of said knife switch, in order to electrically connect the second end of the knife member of said knife switch with the receptacle of said knife switch.

20. A shorting switch for eliminating arcing faults in power distribution equipment, said shorting switch comprising:

insulating housing;

a first contact;

a second contact;

an insulator between said first and second contacts in said insulating housing, said insulator preventing electrical connection of said first and second contacts;

first and second terminals respectively electrically connected to said first and second contacts;

means for moving said first and second contacts toward closure;

means for driving said insulator from between said first and second contacts, in order to electrically connect maid first and second contacts;

wherein said insulating housing is a cylindrical insulating housing; and wherein said first and second contacts form a generally cylindrical structure within said cylindrical insulating housing, said generally cylindrical structure having an opening passing therethrough, said opening receiving said insulator, and wherein said means for driving said insulator comprises a slug, and means for driving said slug between said first and second contacts, in order to drive said insulator from between said first and second contacts; and wherein the opening of said generally cylindrical structure includes a generally planar portion and a generally cylindrical passageway, said generally planar portion and said generally cylindrical passageway normally receiving said insulator, said generally cylindrical passageway having a tapered portion, which receives and captures said slug.

* * * * *